Patented Mar. 9, 1926.

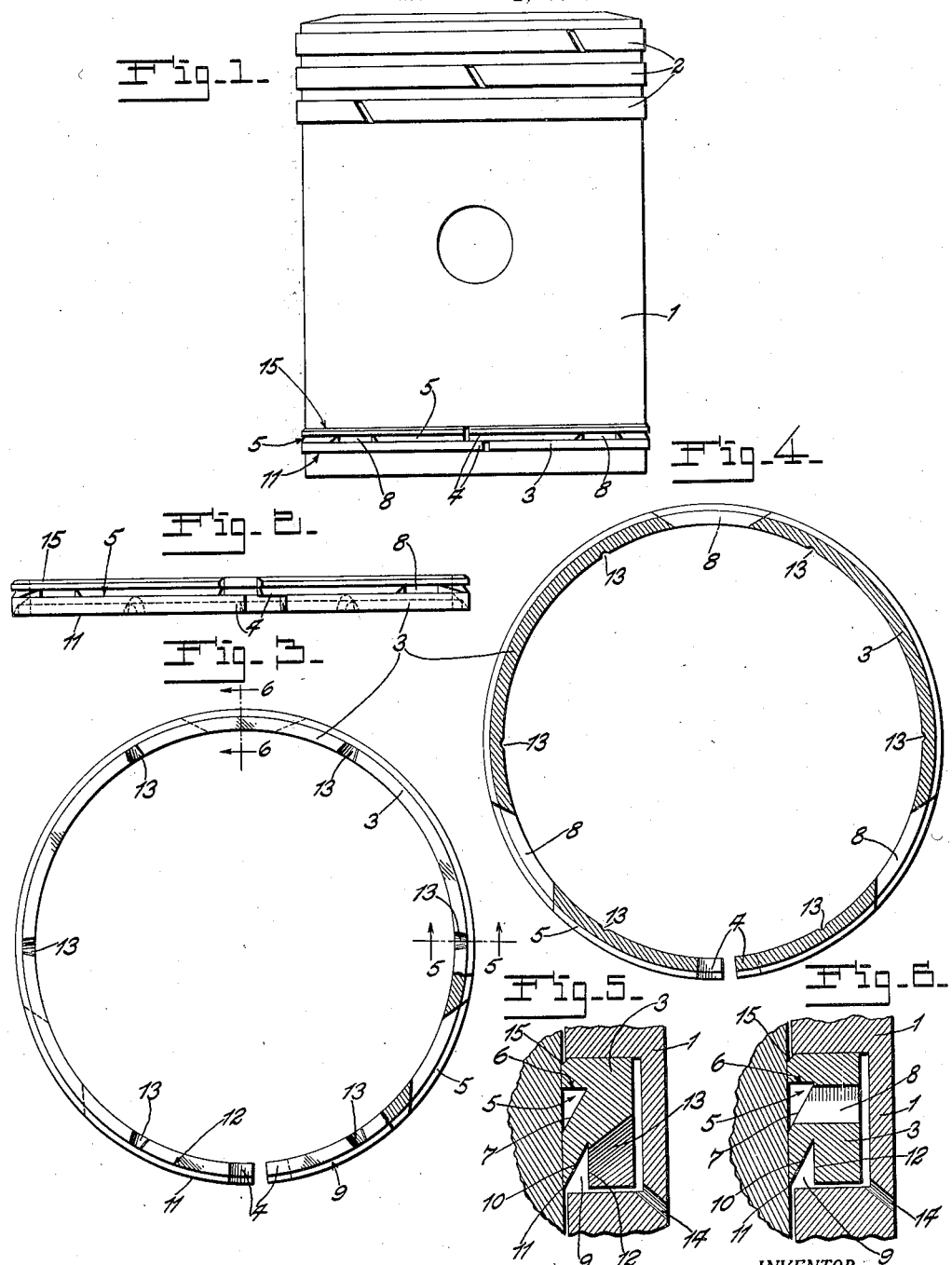

1,575,920

UNITED STATES PATENT OFFICE.

WILLIAM H. KEYS, OF CLAYTON, MISSOURI.

PISTON RING.

Application filed June 1, 1925. Serial No. 33,957.

*To all whom it may concern:*

Be it known that I, WILLIAM H. KEYS, a citizen of the United States, residing at Clayton, St. Louis County, Missouri, have invented new and useful Piston Rings, of which the following is a specification.

This invention relates to piston rings.

An object of the invention is to provide an improved piston ring having a peripheral oil groove and an annular oil groove in the lower side edge, and also having passages permitting oil to pass from one of said grooves to the other and from each groove into the piston groove in which the ring is seated.

Another object of the invention is to provide an improved piston ring having a circumferential oil groove the upper wall of which terminates in a sharp corner at the periphery of the ring, and the lower wall of which slopes downwardly and outwardly to intersection with the periphery of the ring and having an annular oil groove in its lower side edge the outer wall of which slopes outwardly to intersection with the periphery of the ring, and the inner wall of which is approximately vertical; said ring having passages permitting passage of the oil from one groove to the other and from either groove to the inner periphery of the ring.

Another object of the invention is to provide a ring characterized as stated in the foregoing statements of object for use in a piston having passages from the piston groove to the inner side of the piston for discharge of the oil passing into the piston groove from the ring grooves.

Other objects will appear from the following description, reference being made to the accompanying drawing in which—

Fig. 1 is a view showing my improved piston ring applied to a piston.

Fig. 2 is a view of the piston ring detached from the piston.

Fig. 3 is a lower end elevation of the ring with a part broken away showing the passage from the circumferential groove to the inner periphery of the ring.

Fig. 4 is a sectional view of the ring through the circumferential oil groove.

Fig. 5 is a cross sectional view of the ring on the line 5—5 of Fig. 3, showing the ring mounted on a piston.

Fig. 6 is a similar sectional view on the line 6—6 of Fig. 3.

My improved ring is specially designed and adapted for use near the lower end of a piston 1 which is preferably equipped with a number of piston rings 2 near its upper end. My improved ring when used in connection with the lower portion of the piston skirt permits the passage of sufficient oil to obtain proper lubrication, and prevents the passage of excess quantities of oil, thus cooperating with the rings 2 to prevent oil from passing above the piston and fouling the ignition devices.

As shown in the drawing, my improved ring 3 has its end step-cut to form overlapping contacting ends 4, the adjacent edges of which form sliding contact when the ring is compressed within a cylinder as will be understood by reference to Fig. 1. A circumferential oil groove 5 is formed in the periphery of the ring, of which the upper wall 6 terminates in a sharp corner at the periphery of the ring forming an edge to scrape the oil into the groove on the down stroke of the piston. The lower wall 7 inclines downwardly and outwardly to intersection with the periphery of the ring and causes application of the oil contained in the groove to the cylinder wall during the up stroke of the piston. At spaced intervals a number of passages 8 form communication from the groove 5 to the inner periphery of the ring, permitting passage of oil through the ring to and from the groove 5.

The lower side edge of the ring is provided with an annular oil groove 9 the outer wall 10 of which slopes outwardly to intersection with the periphery of the ring forming a sharp scraping edge 11 to scrape oil from the cylinder wall into the groove 9 during the downward stroke of the piston and permitting oil to pass from the groove 9 to the cylinder wall during the upward stroke of the piston. The sharp corner formed by the wall 6 of the groove 5 and the scraping edge 11 are both at the periphery of the ring and contact with the cylinder wall, being outwardly beyond the periphery of the piston upon which the ring is mounted so that both the sharp corner of the wall 7 and the scraping edge 11 function to remove oil from the cylinder wall. The inner wall 12 of the groove 9 is on a considerable shorter radius of curvature than the periphery of the piston for which the ring is intended and when mounted on a piston within a cylinder is located relatively a much greater distance inwardly from the periphery of the piston than the scraping edge 11 is outwardly from the periphery of the piston, thus providing an annular oil chamber having a relatively narrow opening between the scraping edge 11 and the adjacent peripheral corner of the piston. A number of passages 13 in the form of notches form communication from the groove 11 to the inner periphery of the ring, and are spaced circumferentially from the passages 8 so that there are indirect passages from the groove 5 to the groove 9, and vice versa.

If desired the piston may be provided with a number of holes 14 (Figs. 5 and 6) forming passages from the piston groove in which the ring 3 is mounted for discharging oil from said groove through the piston. Thus during the down stroke of the piston excess quantities of oil from the grooves 5 and 9 are forced through the passages 14 and prevented from passing above the ring 3, although sufficient quantities of oil are permitted to pass above the ring 3 to afford proper lubrication. The indirect passages between the grooves constitute means for maintaining a proper quantity of oil in each groove.

The groove 5 is shown as being located above the overlapping contacting surfaces of the ends 4, so that a quantity of oil may pass from the groove 5 between the ends of the ring to deliver oil above the ring 5, thus assuring a sufficient supply of oil above the ring 5 to maintain proper lubrication.

Preferably the upper peripheral corner of the ring 3 is beveled as shown at 15 to prevent forcing the oil upwardly during the up stroke of the piston, leaving the oil spread in a thin film over the cylinder wall.

From the foregoing it will be seen that I have provided an improved sealing and lubricating ring possessing many advantageous features and obtaining all of its intended objects and purposes in a highly efficient and satisfactory manner. The relative arrangement and relationship of the important features of construction may be varied within equivalent limits without departure from the nature and principle of the invention.

I claim:

1. A piston ring having a circumferential oil groove and a groove in its lower side edge, and passages from each of said grooves through the ring to the inner periphery of the ring.

2. A piston ring having a circumferential oil groove with its upper wall terminating in a sharp corner at the periphery of the ring and its lower wall sloping downwardly and having an annular groove in its lower side edge, and passages from each of said grooves to the inner periphery of the ring, the said passages from each groove being circumferentially spaced from the passages in the other groove.

3. A piston ring having a circumferential oil groove with its upper wall terminating in a sharp corner at the periphery of the ring and its lower wall sloping downwardly and having an annular groove in its lower side edge, and passages from each of said grooves to the inner periphery of the ring, the said passages from each groove being in circumferentially spaced relationship to the passages from the other groove, and the passages from said second named groove intersecting the lower side edge of the ring.

WILLIAM H. KEYS.